United States Patent [19]
Bestler et al.

[11] Patent Number: 5,680,457
[45] Date of Patent: Oct. 21, 1997

[54] SYSTEM FOR UPDATING AN AUTHORIZATION MEMORY

[75] Inventors: Caitlin B. Bestler, Lisle; Harry A. Hartley, III, Palatine; Khosro Marcus Rabii, Hawthorn Woods, all of Ill.

[73] Assignee: Zenith Electronics Corporation, Glenview, Ill.

[21] Appl. No.: 427,789

[22] Filed: Apr. 25, 1995

Related U.S. Application Data

[63] Continuation-in-part of Ser. No. 375,319, Jan. 18, 1995.
[51] Int. Cl.$^6$ .................. H04L 9/00; H04N 7/167
[52] U.S. Cl. .................. 380/21; 380/20; 380/49; 380/50
[58] Field of Search .................. 380/19, 20, 49, 380/50, 21; 348/5.5, 10, 12, 13, 423, 461, 467; 455/5.1

[56] References Cited

U.S. PATENT DOCUMENTS

| | | | |
|---|---|---|---|
| 4,623,920 | 11/1986 | Dufresne et al. | 380/20 |
| 4,739,510 | 4/1988 | Jeffers et al. | 380/15 |
| 4,995,080 | 2/1991 | Bestler et al. | 380/21 |
| 5,036,537 | 7/1991 | Jeffers et al. | 380/20 |
| 5,414,773 | 5/1995 | Handelman et al. | 380/49 |
| 5,420,866 | 5/1995 | Wasilewski | 380/10 X |
| 5,517,502 | 5/1996 | Bestler et al. | 370/94.2 |

*Primary Examiner*—Thomas H. Tarcza
*Assistant Examiner*—Pinchus M. Laufer

[57] ABSTRACT

A subscriber terminal includes a digital conditional access module receiving a transport bitstream comprising a plurality of multiplexed conditional access and product packets. Selected ones of the conditional access packets are addressed to respective terminals and include an encrypted new decryption key code, an encrypted authorization bit map and an authorization list range delete code. The conditional access packets are decrypted by the conditional access modules of respective addressed terminals, the decrypted new decryption key code being stored for subsequent use by the conditional access module, the decrypted authorization bit map being used to refresh the authorization bit map memory of the module and the decrypted delete code being used to delete a specified range of authorization codes from the authorization list memory of the module.

23 Claims, 4 Drawing Sheets

Fig. 4A

CA INITIALIZATION PACKET

| PID = 1 | Type | Public S/N | Active & Received CA Key Sources | Active & Received Payload Key Sources | (Comm Bits) | Authorization |
|---|---|---|---|---|---|---|

Encryption: None — Common Key — 1. Private Key / 2. Common Key — Active CA Key Source

Fig. 4B

CA CONFIGURATION LOAD PACKET

| PID = 1 | Type | Public S/N | Received Payload Key Source | Received CA Key Source | Authorization Bit Map | Auth List Range Delete |
|---|---|---|---|---|---|---|

Encryption: None — Active Payload Key Source — Active CA Key Source

Fig. 4C

CA PID AUTH PACKET

| PID = 1 | Type | Public S/N = 1 | PID | Authorization Level | Countdown Reg Level |
|---|---|---|---|---|---|

Encryption: None — Active Payload Key Source — Active CA Key Source

Fig. 4D

CA COMMAND PACKET

| PID = 1 | Type | Public S/N | Command | Data Field |
|---|---|---|---|---|

Encryption: None — Active Payload Key Source — Active CA Key Source

SYSTEM FOR UPDATING AN AUTHORIZATION MEMORY

This application is a continuation-in-part of application Ser. No. 08/375,319, filed Jan. 18, 1995.

BACKGROUND OF THE INVENTION

The present invention relates generally to conditional access systems of the type used to control cable subscriber set-top decoders and particularly concerns a system for refreshing an authorization bit map memory contained within such a decoder.

Conditional access systems for subscriber units such as cable subscriber set-top box decoders are well-known in the art. Conditional access is conventionally achieved by downloading one or more authorization levels for storage in the decoder. The stored authorization levels may comprise a stored bit map or a list of stored individual multi-bit codes, or a combination of both. Each received subscription program, which is normally scrambled or encrypted to prevent access thereto by an unauthorized subscriber, includes an authorization code (sometimes referred to as a program tag) identifying the associated program. If the program tag corresponds to an authorized level in the stored bit map memory or to a stored listed authorization level of the subscriber, a descrambling or decryption circuit within the subscriber's decoder is enabled to descramble or decrypt the signal for viewing by the subscriber. On the other hand, if the received program tag does not match any stored authorization level descrambling or decryption of the accompanying program is inhibited.

Depending on the desired resolution, recent advances in technology have made possible the transmission and reception of one or more digitally compressed television signals over a single 6 MHz television channel. The television signal is preferably compressed and arranged for transport in accordance with international standards established by the Moving Pictures Expert Group (MPEG). In accordance with the MPEG standard, the compressed digital television information may be arranged for transmission in the form of a multiplexed transport stream of fixed length MPEG packets including, for example, video packets, audio packets and conditional access packets (all packets other than conditional access packets being referred to as product packets). Each packet in the transport stream includes a 4-byte header comprising a 13-bit packet identification code (PID) identifying the so-called payload (184 bytes) of the respective packet. A PID having a value equal to one (i.e. 00 . . . 1) has been reserved for use with conditional access packets.

In a general sense, conditional access for digitally compressed subscription systems of the foregoing type may be achieved using techniques quite similar to those employed in prior art analog subscription systems. However, since it is anticipated that the digital systems will make much more extensive use of services such as video-on-demand, it is desirable to provide increased confidence that the operation of the conditional access system is largely tamper-proof. For example, the security of the conditional access system may be compromised by interrupting the conditional access data stream to the decoder, the feasibility of such interruption being facilitated by the fact that the MPEG packet headers are not encrypted. Such interruption of the conditional access data could lead to a situation where, for example, it becomes impossible to retract a previously established authorization level. This presents the subscription system operator with the dilemma of not being able to reuse authorization levels in a timely manner or assume the risk that a non-paying subscriber may have access to the service associated with a reused authorization level. The problem is compounded in connection with services such as pay-per-view television which require frequent recycling of authorization levels.

OBJECTS OF THE INVENTION

It is therefore a basic object of the present invention to provide an improved conditional access system for a subscription service such as a pay cable television system.

It is a more specific object of the invention to provide a conditional access system which is relatively resistant to unauthorized tampering even though the PID's identifying the conditional access data stream are not encrypted.

It is yet a more specific object of the invention to provide a conditional access system in which a subscriber's authorization bit map memory must be refreshed in order to receive a new decryption key for future use by the decoder.

BRIEF DESCRIPTION OF THE DRAWINGS

These and other objects and advances of the invention will be apparent upon reading the following description in conjunction with the drawings, in which.

DESCRIPTION OF THE PREFERRED EMBODIMENT

Figure 1:
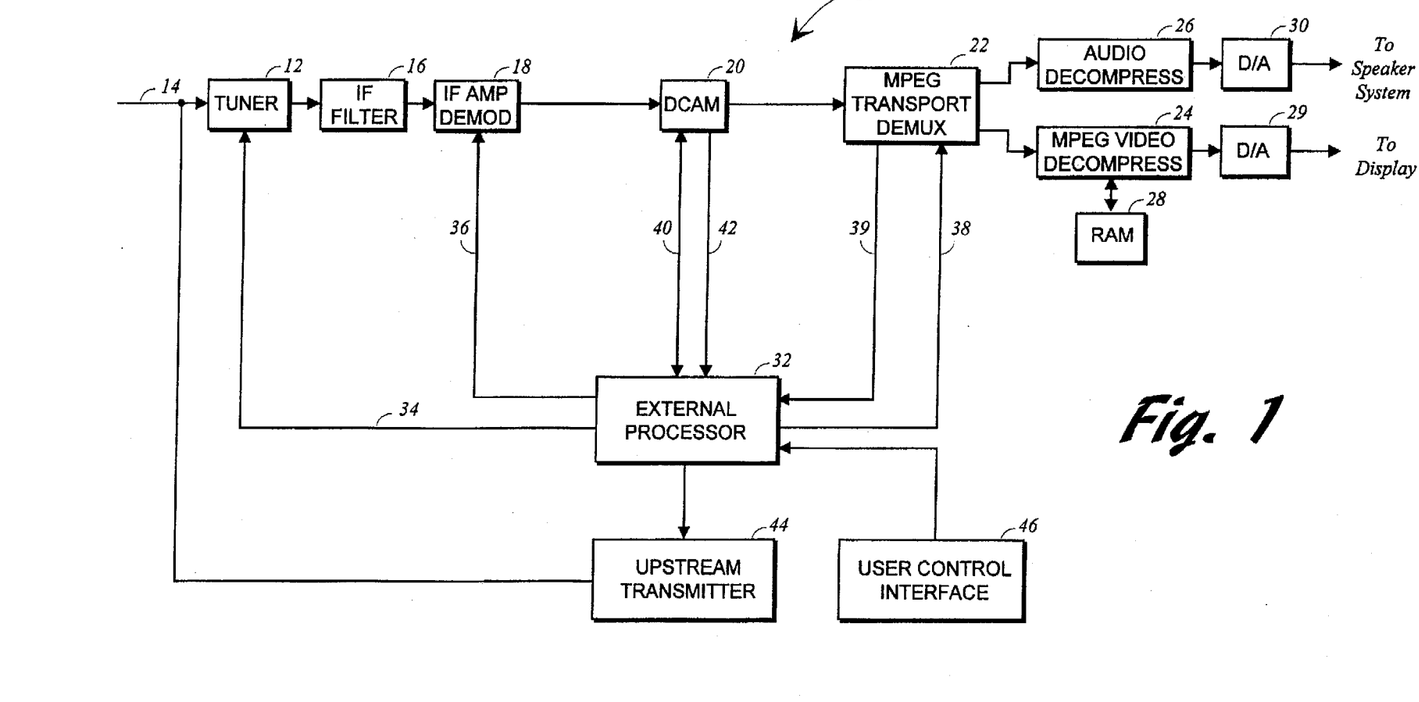
FIG. 1 is a simplified block diagram of a subscription decoder constructed in accordance with the present invention.

FIG. 1 sets forth a block diagram of a television subscriber terminal constructed in accordance with the present invention and generally referenced by numeral 10. Subscriber terminal 10 includes a tuner 12 coupled to a cable television distribution system or other suitable transmission medium by a cable 14. The output of tuner 12 is coupled to an intermediate frequency (IF) filter 16, typically a SAW filter, and therefrom to the input of an IF amplifier and demodulator circuit 18. Demodulator 18 may comprise, for example, a multilevel VSB or QAM demodulator.

The output of demodulator 18 comprises an MPEG transport bitstream including a series of MPEG product and conditional access (CA) packets. As previously mentioned, each such packet includes an unencrypted 4-byte header comprising a 13-bit PID identifying the contents of the packet followed by 184-bytes of encrypted payload. A plurality of further bytes (e.g. 20) may be appended to the packet to facilitate the error correction and detection functions of demodulator 18. A product packet may comprise a compressed video packet, a compressed audio packet or a packet containing auxiliary data. Each such packet is identified by its own unique PID, with a PID having a value of one (00 . . . 01) be reserved for CA packets. Depending on the degree of compression employed and on the maximum bit-rate provided by the transmission system, the transport bitstream derived from a tuned 6 MHz television channel may represent one or more television programs, the components (e.g. video and audio) of each television program being identified by its own respective PID's.

The MPEG transport bitstream developed at the output of demodulator 18 is coupled to a digital condition access module (DCAM) 20 which will be described in further detail hereinafter. For now it is sufficient to understand that DCAM 20 is responsive to CA packets multiplexed in the transport bitstream for selectively authorizing and deauthorizing subscriber terminal 10 for various television programs and other services. DCAM 20 is also operative for decrypting the payloads of product packets having PID's corresponding to a program selected for viewing by the subscriber and for which the subscriber has appropriate authorization. The output of DCAM 20 is coupled to an MPEG transport demultiplexer 22 which couples the decrypted video packets to a video decompression circuit 24 and the decrypted audio packets to an audio decompression circuit 26. Video decompression circuit 24 may include a random access memory 28 coupled thereto. The decompressed video signal developed at the output of video decompression circuit 24 is applied to a D/A converter 29 which is coupled to a suitable video display. Correspondingly, the decompressed audio signal developed at the output of audio decompression circuit 26 is applied to a D/A converter 30 which is coupled to a suitable audio system.

Subscriber terminal 10 further includes a microprocessor 32 responsive to signals from a user control interface 46. The microprocessor includes a channel selection output 34 for controlling tuner 12 (i.e. for tuning a selected 6 MHz television channel) and an output 36 for controlling demodulator 18. Microprocessor 32 also has an output 38 for controlling transport demultiplexer 22 and receives data, e.g. network directories and program map tables, from the demultiplexer over a line 39. Microprocessor 32 is further bi-directionally coupled to DCAM 20 by a bus 40 and is supplied with an interrupt signal by DCAM 20 over a line 42. An upstream transmitter 44 is supplied by microprocessor 32 and has an output coupled to cable 14 for providing upstream transmissions over the cable distribution system.

In operation, a plurality of broadcast 6 MHz RF channels are coupled by cable 14 to the input of tuner 12 which, in response to a channel selection signal supplied by microprocessor 32, couples a selected channel to intermediate frequency filter 16. Filter 16 may be constructed in accordance with conventional fabrication techniques and may, for example, include a conventional surface acoustic wave filter or its equivalent. The output of filter 16 is demodulated by intermediate frequency amplifier and demodulator circuit 18. Demodulator 18, which may comprise a synchronous demodulator, recovers the digital MPEG transport bitstream comprising CA packets and product packets representing one or more television programs. While different transmission signal formats and methods may be utilized in communicating data through the cable distribution system, the preferred embodiment shown in FIG. 1 utilizes a digital vestigial sideband (VSB) modulation system in which N-level (e.g. 16, 8, 4 or 2-level) symbols having a symbol rate of approximately 10.76 megahertz are transmitted and received over cable 14. The transport bitstream generated at the output of demodulator 18 is further selectively processed by DCAM 20 and thereafter demultiplexed in demultiplex circuit 22 to provide selected input video and audio signals to decompression circuits 24 and 26 respectively. Circuits 24 and 26 perform conventional video and audio decompression operations upon the applied video and audio data to produce decompressed video and audio signals which are converted to corresponding analog signals within digital to analog converters 29 and 30. The analog signals thus provided may be applied to the video display and audio system of the subscriber's television receiver.

Figure 2:
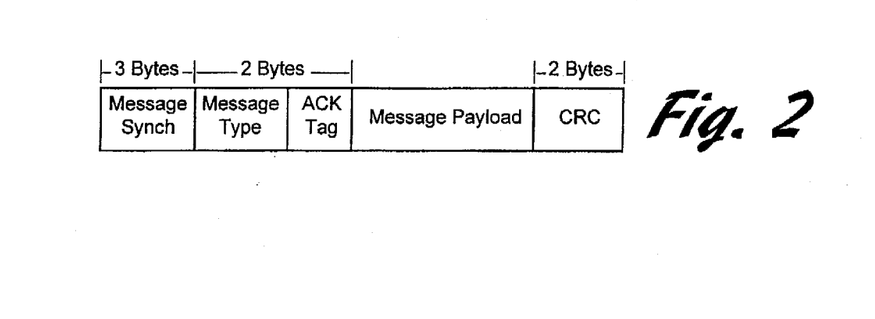
FIG. 2 illustrates the format of an upstream transmission packet.

Upstream messages are preferably effected by transmitter 44 in data packets as illustrated in FIG. 2. As shown in the Figure, the upstream data packet comprises a 3-byte Message Synch code followed by a 2-byte Message Type code. The remainder of the packet comprises the upstream message payload and a 2-byte CRC. The message payload typically comprises a subscriber identification number and the identification of a particular requested service, such as a particular impulse-pay-per-view (IPPV) television program. The Message Type code identifies the type of message provided in the message payload and further comprises an Acknowledgment (ACK) tag which, in the preferred embodiment of the invention, can take either one of two values referred to as odd ACK and even ACK.

The ACK tag in the Message Type code identifies the packet as requiring either odd acknowledgment (odd ACK tag) or even acknowledgment (even ACK tag). Two packets may therefore be transmitted one after the other, one with an even ACK tag and the other with an odd ACK tag. Receipt by terminal 10 of an even acknowledgment from the central facility indicates successful reception of the upstream packet with the even ACK tag and receipt of an odd acknowledgment indicates successful reception of the upstream packet with the odd ACK tag. Odd and even acknowledgments (or more if an ACK tag having a value greater than 2 is used) are received by terminal 10 in CA packets addressed to the terminal, and in particular to DCAM 20 of the terminal.

Figure 3:
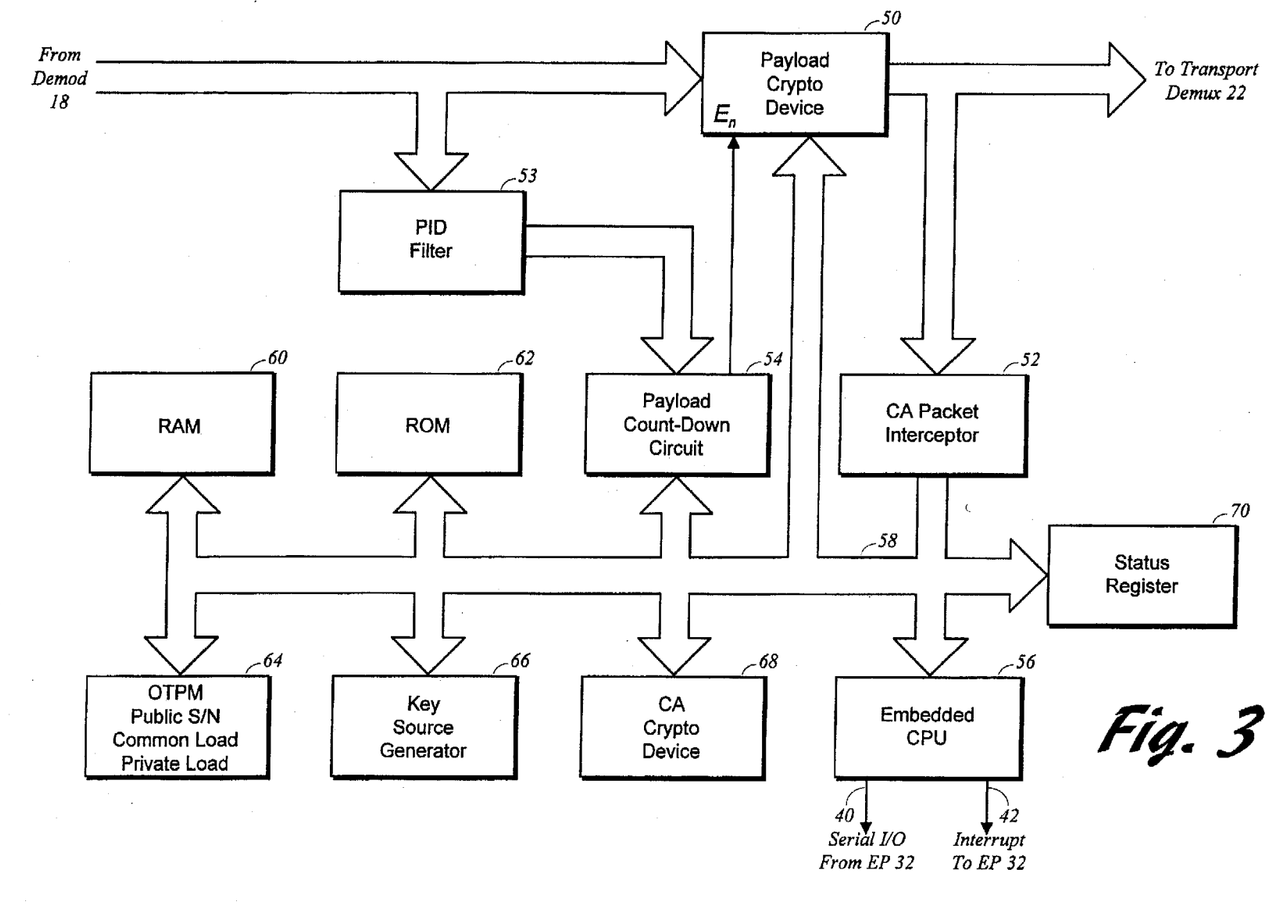
FIG. 3 is a block diagram of the DCAM shown in FIG. 1.

The structure of DCAM 20 is shown in greater detail in FIG. 3. DCAM 20 preferably comprises an application specific integrated circuit (ASIC) which implements the conditional access and decryption functions of subscriber terminal 10. As shown in FIG. 3, the transport bitstream from demodulator 18 is supplied to a payload crypto device 50, whose output is coupled to transport demultiplexer 22 and also supplies a CA packet interceptor 52. The transport bitstream is also supplied through a PID filter 53 to a payload countdown circuit 54 which includes an output coupled to the Enable input of payload crypto device 50. The output of CA packet interceptor 52 is supplied to an embedded CPU 56 over a bus 58. Bus 58 also couples CPU 56 to payload countdown circuit 54, a RAM 60, a ROM 62, a one-time-programmable memory (OTPM) 64, a key source generator 66, a CA crypto device 68 and a status register 70. Communications between CPU 56 and processor 32 (see FIG. 1) are effected over lines 40 and 42.

Figure 4A:
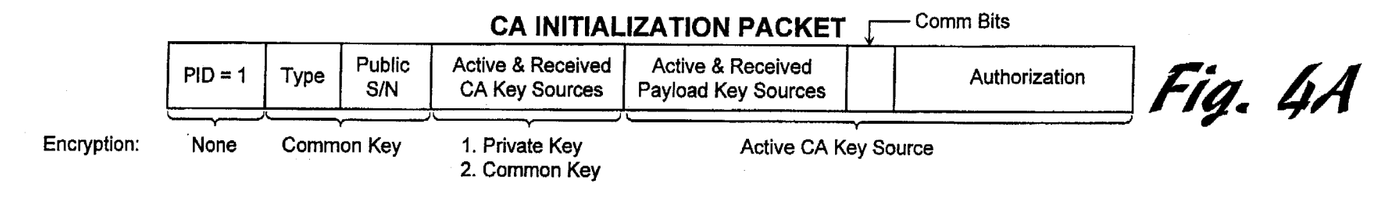
FIGS. 4A–4D are diagrammatic representations of different CA packets according to the invention.

The operation of DCAM 20 is controlled by CA packets (PID=1) coupled by CA packet interceptor 52 to CPU 56. There are a number of different types of CA packets (identified by the first 3-bits of the packet payload) including CA initialization packets, CA configuration load packets, CA PID authorization packets and CA command packets. The CA initialization packets (see FIG. 4A) are used to initialize various keys used in DCAM 20, to initialize the subscriber authorization levels of a bit map (e.g. 256 bits) and an authorization list stored in RAM 60 and to supply a series of communication status bits used to control the operation of upstream transmitter 44. In particular, each subscriber DCAM 20 includes a unique 4-byte public serial number (S/N), a common load and a private (master) load all stored in OTPM 64. The common and private (master) loads are combined with selected bytes of ROM 62, which includes a stored program for controlling the operation of CPU 56, for providing respective common and private (master) keys. Each subscriber DCAM further includes active CA and payload key sources and received CA and payload key sources provided by key source generator 66. Each CA initialization packet includes the public S/N of one or more subscriber terminals together with the associated active and received CA and payload key sources and authorization bit map. The received public S/N, which is encrypted with the network common key, is decrypted by payload crypto device 50 in response to the common key derived from OTPM 64. The decrypted public S/N is supplied to CPU 56 which determines whether it matches the public S/N stored in OTPM 64. If a match exists, CPU 56 fetches the received active and received CA key sources for storage in key source generator 66. These key sources are encrypted first with the private key corresponding to the packet public S/N and then with the network common key. They are therefore decrypted first by payload crypto device 50 using the common key from OTPM 64 and then by the CA crypto device 68 using the private key from OTPM 64. The active CA key source now provided by key source generator 66 is used to build a decryption table used by CA crypto device 68 to decrypt further CA encrypted data bytes. Such further data bytes include the active and received payload key sources which after decryption are stored in key source generator 66, the communication status bits which after decryption are stored in status register 70 and the initial authorization bit map which, after decryption, is stored in RAM 60.

The portion of RAM 60 used for storing authorization levels is shown more particularly in FIG. 5 and is referred to hereinafter as the authorization memory. As shown in the Figure, the authorization memory comprises 224 bytes, the first 32 bytes (256 bits) of which are used to store the authorization bit map. In particular, each of the 256 bits of the authorization bit map represents a respective authorization level, the bit being set to "1" indicating that the subscriber is authorized for the corresponding service. As described above, the bit map is initialized in the authorization memory of RAM 60 in response to the CA initialization packet. The remainder of the authorization memory is used to store a list of up to 64 three-byte authorization codes, each representing the subscriber's authorization for a particular service or event. The authorization codes are downloaded to the authorization memory using CA command packets (see FIG. 4D) as will be described in more detail hereinafter.

Figure 4B:
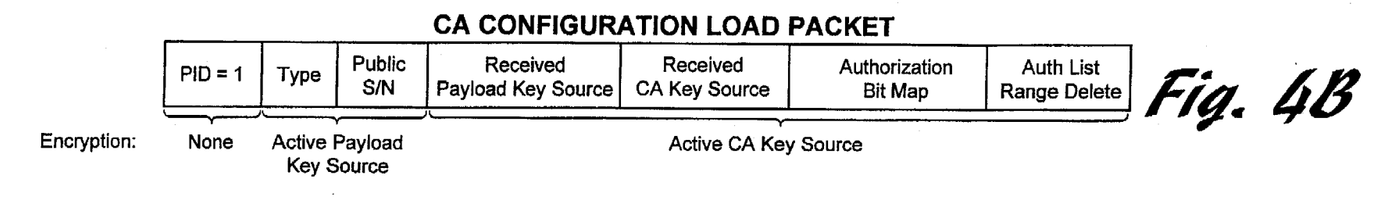

The CA configuration load packet is illustrated in FIG. 4B. It is generally similar in format to the CA initialization packet and is used to provide new CA and payload key sources for key source generator 66. The packet is also at the same time used to refresh the authorization bit map and to delete selected authorization codes of the authorization list stored in RAM 60. As shown in FIG. 4B, the packet type and public S/N are encrypted using the active payload key source previously downloaded in a CA initialization packet and are therefore decrypted by payload crypto device 50 in response to the corresponding decryption table. If CPU 56 establishes that the decrypted public S/N matches the public S/N stored in OTPM 64, the received payload and CA key sources, an authorization bit map and an authorization list range delete code are decrypted by CA crypto device 68. The decrypted key sources will become the active key sources if they differ from the current active key sources and result in rebuilt decryption tables for payload and CA crypto devices 50 and 68. The decrypted bit map is applied to RAM 60 to refresh the first 256 bits of the authorization memory of RAM 60 shown in FIG. 5. The decrypted authorization list range delete code identifies a range of three-byte memory locations of the authorization list of RAM 60 and is applied by CPU 56 to RAM 60 for deleting the three-byte authorization codes stored in the identified range of memory locations.

Processing of the CA initialization and configuration load packets therefore results in DCAM 20 having been individually addressed to download various decrypted critical operating parameters (i.e. decryption keys and authorization levels). In particular, the CA key source is downloaded after it is decrypted using the private key of DCAM 20, the downloaded CA key source being used in turn to provide for downloading of the payload key source. Moreover, a would-be pirate can neither artificially create nor selectively filter subsequent CA packets since the packet payload, including CA packet type, of each such CA packet is encrypted using the payload and CA key sources. As will be explained in further detail, the inability to either create illegitimate CA packets or selectively filter de-authorizing packets prevents a would-be pirate from compromising system security.

Furthermore, as described above, according to an important aspect of the invention, the CA configuration load packets are used to provide new key sources for the DCAM while at the same time refreshing the authorization bit map portion of RAM 60. In this way, the authorization bit map is refreshed each time new key sources are provided to the DCAM. Interruption of the receipt of CA packets in an attempt to prevent authorization bit map updates (e.g. to deauthorize selected service levels for non-payment or to reset authorization bits used for pay-per-view services) is thereby frustrated since the new decryption key sources will likewise be withheld. Thus, the subscriber authorization bit map must be kept up to date as a precondition for decryption key source renewal. Also, the authorization list range delete code is used to delete a specified range of three byte authorization codes from the authorization list of RAM 60, thereby insuring the unavailability of these codes unless downloaded after the provision of new key sources to the DCAM. That is, by initiating use of the new key sources prior to reusing the authorization codes stored in the specified range, it is possible to prevent retention of old authorization codes and their application to future programs and services. The specified range of memory locations may include the entire authorization list memory (i.e. bytes 32–223 in FIG. 5), a portion of contiguous three-byte memory locations of the full list (e.g. representing inactive but previously used authorization codes) or a null range when the delete feature is not to be exercised.

Figure 4C:
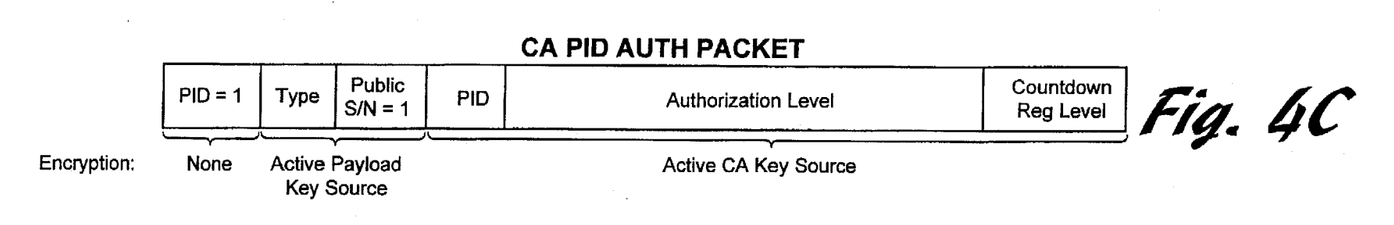

The format of a CA PID authorization packet is illustrated in FIG. 4C. This packet, which is globally addressed using a public S/N=1, is the most frequently transmitted CA packet. The packet comprises a type code and a public S/N=1, both encrypted using the active payload key source and both decrypted by payload crypto device 50. The packet further comprises one or more PID's, each with an associated authorization level and countdown register level, all encrypted using the active CA key source and therefore decrypted by CA crypto device 68. As will be explained in further detail hereinafter, each active PID within a given 6 MHz channel must be transmitted and received by DCAM 20 in a CA PID authorization packet at a predetermined minimum rate in order to maintain payload crypto device 50 operable for decrypting payloads of product packets with corresponding PID's. Therefore, if the CA bitstream to DCAM 20 is interrupted, payload crypto device 50 will become inhibited and thereby cease decrypting product packets.

More specifically, assume a subscriber elects to view a particular television program contained within a tuned 6 MHz television channel. The selected program has an authorization level "A" and is comprised of packets having PID's 317, 318 and 319. PID 317 may, for example, identify compressed video packets, PID 318 compressed audio packets and PID 319 auxiliary data packets. Upon selecting the program (using user control interface 46), external processor 32 causes CPU 56 to determine whether the subscriber is authorized to view the program. That is, CPU 56 checks RAM 60 to determine if authorization level "A" is found in the stored authorization bit map or authorization list. Assuming authorization level "A" is found in RAM 60, the three PID's 317, 318 and 319 of the selected program are transferred over bus 58 for storage in respective PID registers 72a, 72b and 72c (see FIG. 6) of payload countdown circuit 54. At the same time, respective associated countdown registers 74a, 74b, and 74c of countdown circuit 54 are set to selected values. Payload crypto device 50 is operative for decrypting product packets only if the PID of the respective packet is stored in one of the ten PID registers 72a–72j of countdown circuit 54 (the packet PID's are supplied to countdown circuit 54 by PID filter 53) and the contents of the corresponding countdown register does not equal zero. Therefore, payload crypto device 50 begins decrypting payloads of product packets having PID's 317,318 and 319 and couples the decrypted packet payloads (together with all unencrypted packets) to transport demultiplexer 22 for further processing. Moreover, each time a product packet having a PID stored in a PID register 72a–72c is received by countdown circuit 54, the associated PID countdown register 74a–74c of countdown circuit 54 is decremented by a factor of unity. If any one of the countdown registers reaches a value of zero, countdown circuit 54 inhibits payload crypto device from decrypting any further packets having the corresponding PID. For example, if countdown register 74a, which is associated with PID register 72a storing PID 317, reaches a zero count, countdown circuit 54 will inhibit payload crypto device 50 from encrypting any further product packets having PID 317.

Figure 6:
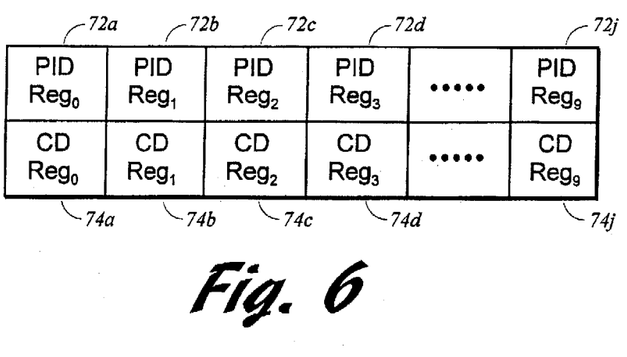
FIG. 6 illustrates the PID and countdown registers of the DCAM of FIG. 3.

However, under normal operating conditions CA PID authorizations packets are transmitted and received at a rate sufficient to prevent anyone of the countdown registers 74a–74c from reaching a zero count. In particular, after verification by CPU 56 that the authorization level of a received CA PID authorization packet matches a subscriber authorization level in RAM 60 and that its PID matches a PID stored in one of the PID registers 72a–72j, the associated countdown register 74a–74j is set to the countdown register level value of the received CA PID authorization packet. The countdown register level preferably comprise one byte allowing the countdown register to be set to any one of 256 different values. It will thus be seen that by operating the network such that appropriate CA PID authorization packets (i.e. having selected PID/authorization level pairs) are transmitted and received before a given countdown register reaches a zero value, payload crypto device 50 will remain operative for decrypting product packets having the corresponding PID's. Authorization level matches may be established by searching the authorization list and bit map of RAM 60 in response to each received CA PID authorization packet. Alternatively, the authorization list and bit map may be searched only once in response to the viewer's program request. The corresponding authorization level, assuming that a match exists, is then stored in a reserved portion of RAM 60 associated with the PID's stored in PID registers 72a–72j and is checked for a match with each received CA PID authorization packet. The latter approach is, of course, less CPU intensive since a search of RAM 60 is not effected in response to each received CA PID authorization packet. However, the latter approach requires re-examination of the PID list after any change in authorization levels of the decoder.

Assume, now for example, that a subscriber interrupts the CA bitstream in an attempt to prevent deauthorization by denying network access to the authorization levels stored in RAM 60. While interruption of the CA bitstream may achieve this goal, it will also interrupt receipt of the CA PID authorization packets, thereby allowing the PID countdown registers 74a–74J to assume zero counts and inhibit decryption of the product packets having PID's stored in PID registers 72a–72j. As a result, the subscriber will be denied access to the program even though the network cannot access RAM 60 for deauthorizing the corresponding service level.

As a further option, the operation of DCAM 20 can be enhanced such that countdown registers 74a–74j are each also decremented in response to the receipt of any CA packet (PID=1). This will in effect clear (i.e. set to zero) all countdown registers 74a–74j having corresponding PID registers 72a–72j storing inactive PID's.

Referring back to FIG. 3, the communication status bits stored in status register 70 (derived from a received CA initialization packet) represent central facility acknowledgments of upstream packets transmitted by terminal 10. In particular, one communication status bit is provided for each ACK tag used by upstream transmitter 44 to signal acknowledgment of a message transmitted using the respective ACK tag. In the case of the preferred embodiment which uses odd and even ACK tags for upstream transmission packets, two communication bits are provided—one for each ACK tag. Acknowledgment of an upstream packet is provided by setting the respective communication status bit to "1" in the downstream CA initialization packet and then storing the received bit in status register 70. CPU 56 subsequently generates an interrupt to microprocessor 32 and transfers all stored communication status bits in one contiguous group from status register 70 to the microprocessor, after which the register is cleared. The transferred status communication bits thereby provide an indication to microprocessor 32 that the respective previously transmitted packet(s) have been successfully received at the central facility. Absent such indication, microprocessor 32 will initiate retransmission of the packet (using either an odd or even ACK tag) in accordance with a suitable backoff algorithm until an acknowledgment is received from the central facility in the form of an appropriately set communication bit as previously described.

In addition to the foregoing, one of the communication bits of the downstream CA packet is preferably designated as an Interrogate Command (IC) bit. The IC bit is transferred in parallel with the other communication bits (representing upstream packet acknowledgments) from status register 70 of DCAM 20 to processor 32. In response to the IC bit, processor 32 applies a predetermined message to upstream transmitter 44 for transmission back to the central facility. The predetermined message includes the S/N of the terminal and may also reflect various operating parameters, e.g. power level, of the upstream transmitter and is therefore useful in diagnosing problems effecting upstream transmissions.

Figure 7:
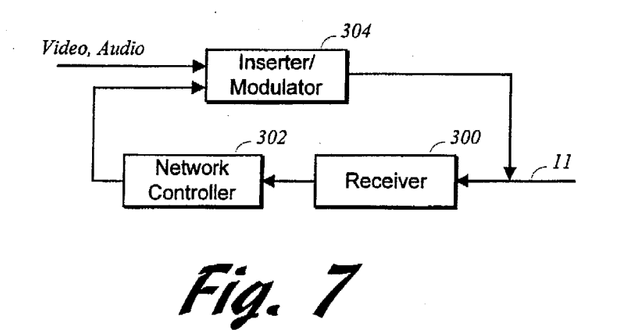
FIG. 7 sets forth a block diagram of the headend of the system of the invention.

Upstream packets are preferably transmitted by transmitter 44 in respective time slots which may be assigned for use in a reserved mode wherein a given time slot is reserved only for usage by a particular terminal or in a contention mode wherein all terminals may attempt to use the time slot to gain access to the network, all under supervision of the central facility. In particular, referring to FIG. 7, upstream packets from subscriber terminal 10 are received over cable 11 by a receiver 300 and supplied to a network controller 302. Controller 302 generates data and CA packets for downstream transmission, the CA packets being intercepted by DCAM 20 as previously described and the data packets being supplied to microprocessor 32 by transport demux 22. The output of network controller 302 is combined with video and audio data in an inserter/modulator 304 and transmitted in the downstream direction in the format previously described.

Figure 4D:
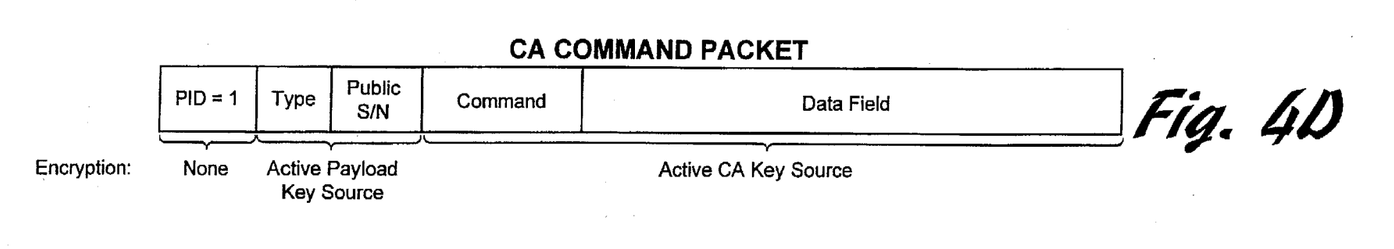
Figure 5:
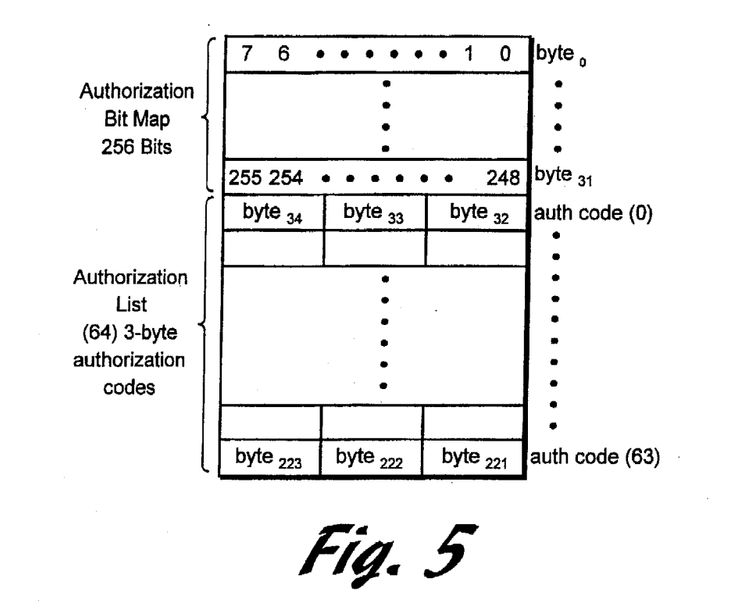
FIG. 5 illustrates the authorization memory of RAM 60 of the DCAM of FIG. 3.

FIG. 4D illustrates the CA command packet. In general, this CA packet may be addressed to a particular subscriber DCAM for commanding the DCAM to execute a prescribed action, such as to set one of the bits in the authorization bit map of RAM 60 or to add a 3-byte authorization code to the authorization list of the memory. As shown in the Figure, the packet comprises a packet type and up to 32 public S/N's encrypted using the active payload key source of the DCAM and which are decrypted by payload crypto device 50. If CPU 56 establishes that one of the decrypted public S/N's matches the public S/N stored in OTPM64, the associated one-byte command code and 3-byte data field are decrypted by CA crypto device 68. The command code, for example, may direct CPU56 to use the data field to update the authorization memory of RAM 60. In this regard, if the 3-byte data field has a value less than 256 it will be used to set or reset the corresponding bit of the memory bit map and if it has a value equal to or greater than 256 it will be used to add the 3-byte data field as an authorization code to the authorization list (see FIG. 5).

What has thus been described is a novel conditional access system providing increased security against unauthorized tampering. It is recognized that numerous changes in the described embodiment of the invention will be apparent to those skilled in the art without departing from its true spirit and scope. The invention is to be limited only as defined in the claims.

What is claimed:

1. A method of refreshing an authorization bit map memory of a subscriber terminal having a stored active decryption key code; comprising the steps of:

multiplexing a plurality of product and conditional access data packets to form a transport bitstream, selected ones of said conditional access packets being addressed to said subscriber terminal and each of said selected conditional access packets comprising an encrypted new decryption key code and an encrypted authorization bit map;

transmitting the transport bitstream to said terminal;

decrypting the transmitted new decryption key code and authorization bit map at said terminal in response to said stored active decryption key code;

storing said decrypted new decryption key code for subsequent use in place of said stored active decryption key code; and applying said decrypted authorization bit map for refreshing said authorization bit map memory.

2. The method of claim 1 wherein said terminal includes an authorization list memory comprising a plurality of multi-byte memory locations for storing respective multi-byte authorization codes, each authorization code representing a respective authorization level and wherein said selected conditional access packets further comprise an encrypted delete code identifying a range of said multi-byte memory locations, including decrypting said encrypted delete code and deleting the multi-byte authorization codes stored in the range of memory locations identified by said decrypted delete code.

3. The method of claim 2 wherein said range comprises a plurality of contiguous ones of said multi-byte memory locations.

4. The method of claim 1 wherein said authorization bit map memory comprises a plurality of contiguous single bit memory locations each representing a respective authorization level and wherein said decrypted authorization bit map comprises a number of bits corresponding to the size of said authorization bit map memory.

5. The method of claim 4 including replacing the contents of each of said single bit memory locations with a corresponding bit of said decrypted authorization bit map.

6. The method of claim 5 wherein said terminal includes an authorization list memory comprising a plurality of multi-byte memory locations for storing respective multi-byte authorization codes each representing a respective authorization level and wherein a further one of said conditional access packets is addressed to said subscriber terminal and comprises a selected encrypted authorization code, including decrypting said selected encrypted authorization code and applying the decrypted authorization code for updating the contents of one of said single bit memory locations if the value thereof falls within a predetermined range of values and otherwise applying the decrypted authorization code for storage in one of said multi-byte memory locations.

7. The method of claim 1 wherein said conditional access packets have a unique packet identification code and including intercepting said conditional access packets in response to said unique packet identification code prior to said decrypting step.

8. The method of claim 1 wherein said selected conditional access packets comprise an identification code uniquely identifying said subscriber terminal encrypted in a form different from said encrypted new decryption key code and encrypted authorization bit map and including, prior to the step of decrypting said new decryption key code and authorization bit map, decrypting said encrypted identification code and determining whether the decrypted identification code matches the terminal identification code.

9. The method of claim 8 wherein said selected conditional access packets include encrypted new first and second decryption key codes and including decrypting said encrypted new first and second decryption key codes at said terminal in response to said stored active decryption key code and storing said decrypted new first decryption key code for subsequent use in decrypting said identification codes and storing said decrypted new second decryption key code for subsequent use in place of said stored active decryption key code.

10. The method of claim 9 wherein said product packets are encrypted and including using said stored first decryption key codes to decrypt said encrypted product packets.

11. A method of refreshing an authorization bit map memory of a subscriber terminal having a stored active decryption key code, comprising:

receiving a transport bitstream comprising a plurality of multiplexed product and conditional access data packets, selected ones of said conditional access packets being addressed to said subscriber terminal and each of said selected conditional access packets comprising an encrypted new decryption key code and an encrypted authorization bit map;

decrypting the received new decryption key code and authorization bit map in response to said stored active decryption key code;

storing said decrypted new decryption key code for subsequent use in place of said stored active decryption key code; and applying said decrypted authorization bit map for refreshing said authorization bit map memory.

12. The method of claim 11 wherein said selected conditional access packets further comprise an encrypted delete code and wherein said terminal comprises an authorization list memory including a plurality of multi-byte memory locations for storing respective multi-byte authorization codes each representing a respective authorization level, including decrypting said encrypted delete code and deleting the multi-byte authorization codes stored in a range of memory locations identified by said decrypted delete code.

13. The method of claim 12 wherein said range comprises a plurality of contiguous ones of said multi-byte memory locations.

14. The method of claim 11 wherein said authorization bit memory comprises a plurality of contiguous single bit memory locations each representing a respective authorization level and wherein said decrypted authorization bit map comprises a number of bits corresponding to the size of said authorization bit map memory.

15. The method of claim 14 including replacing the contents of each of said single bit memory locations with a corresponding bit of said decrypted authorization bit map.

16. The method of claim 11 wherein a further one of said received conditional access packets is addressed to said subscriber terminal and comprises a selected encrypted authorization code, said terminal further comprising an authorization list memory including a plurality of multi-byte memory locations for storing respective multi-byte authorization codes, including decrypting said selected encrypted authorization code and applying the decrypted authorization code for updating the contents of one of said single bit memory locations of said authorization bit map memory if the value thereof falls within a predetermined range of values and otherwise applying the decrypted authorization code for storage in one of said multi-byte memory locations of said authorization list memory.

17. The method of claim 11 wherein said conditional access packets have a unique packet identification code and including intercepting said conditional access packets in response to said unique packet identification code prior to said decrypting step.

18. The method of claim 11 wherein said selected conditional access packets comprise an identification code uniquely identifying said subscriber terminal encrypted in a form different from said encrypted new decryption key code and encrypted authorization bit map and including, prior to the step of decrypting said new decryption key code and authorization bit map, decrypting said encrypted identification code and determining whether the decrypted identification code matches the terminal identification code.

19. The method of claim 18 wherein said selected conditional access packets include encrypted new first and second decryption key codes and including decrypting said encrypted new first and second decryption key codes at said terminal in response to said stored active decryption key code and storing said decrypted new first decryption key code for subsequent use in decrypting said identification codes and storing said decrypted new second decryption key code for subsequent use in place of said stored active decryption key code.

20. The method of claim 19 wherein said product packets are encrypted and including decrypting said product packets using said stored first decryption key code.

21. A method of controlling the contents of an authorization memory of a subscriber terminal having a stored active decryption key code, comprising the steps of:

multiplexing a plurality of product and conditional access data packets to form a transport bitstream, selected ones of said conditional access packets being addressed to said subscriber terminal and each of said selected conditional access packets comprising an encrypted new decryption key code and an encrypted authorization memory update code;

transmitting the transport bitstream to said terminal;

decrypting the transmitted new decryption key code and authorization update code at said terminal in response to said stored active decryption key code;

storing said decrypted new decryption key code for subsequent use in place of said stored active decryption key code; and applying said decrypted authorization update code for updating the contents of said authorization memory.

22. The method of claim 21 wherein said authorization memory comprises an authorization bit map memory and wherein said authorization memory update code comprises an authorization bit map, said applying step comprising applying the decrypted authorization bit map for refreshing said authorization bit map memory.

23. The method of claim 21 wherein said authorization memory comprises an authorization list including a plurality of multi-byte memory locations for storing respective multi-byte authorization codes each representing a respective authorization level and wherein said authorization memory update code comprises a delete code, said applying step comprising applying the decrypted delete code for deleting the multi-byte authorization codes stored in a range of said memory locations identified by said decrypted delete code.

* * * * *